340-690
1/30/79    OR    4,136,556    SR

United States Patent [19]
Graham

[11] 4,136,556
[45] Jan. 30, 1979

[54] DEVICE TO MONITOR MOVEMENT OF A SURFACE

[75] Inventor: Glenn A. Graham, Lexington, Ky.

[73] Assignee: Massachusetts Institute of Technology, Cambridge, Mass.

[21] Appl. No.: 868,596

[22] Filed: Jan. 11, 1978

[51] Int. Cl.² .......................................... G01N 33/24
[52] U.S. Cl. ..................................... 340/690; 73/781; 73/784
[58] Field of Search ......... 73/88 E; 33/125 B, 147 D; 116/DIG. 34

[56] References Cited
U.S. PATENT DOCUMENTS 3,111,655  11/1963  Kotarsky et al. ............... 73/88 E X
3,600,938   8/1971  Waddell .............................. 73/88 E Primary Examiner—Jerry W. Myracle
Attorney, Agent, or Firm—Arthur A. Smith, Jr.; Robert Shaw

[57] ABSTRACT

A device to monitor movement of a surface such as, for example, the roof of a mine tunnel or the like and to provide an indication if that movement exceeds some predetermined creep rate or velocity. The device includes a sensing member formed of a material whose precise creep characteristics as a function of stress and strain are known. The device includes a sensing member formed of a material whose precise creep characteristics as a function of stress and strain are known.

11 Claims, 15 Drawing Figures

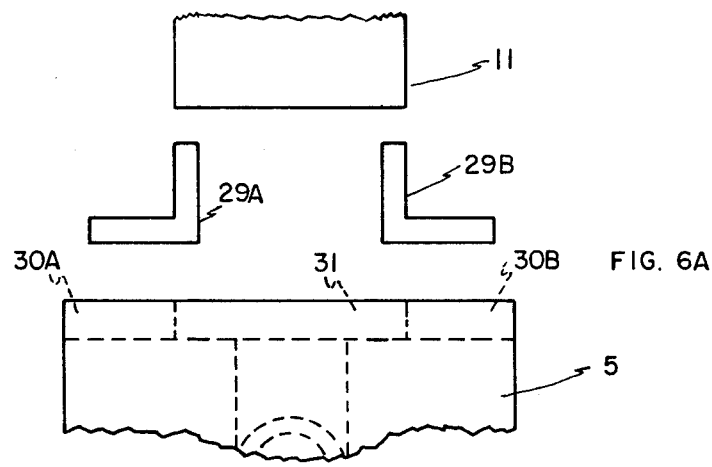
FIG. 6A
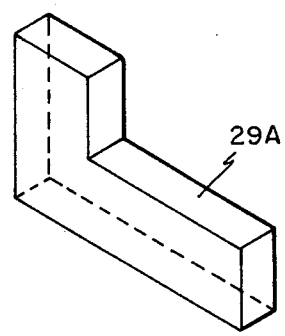
FIG. 6B
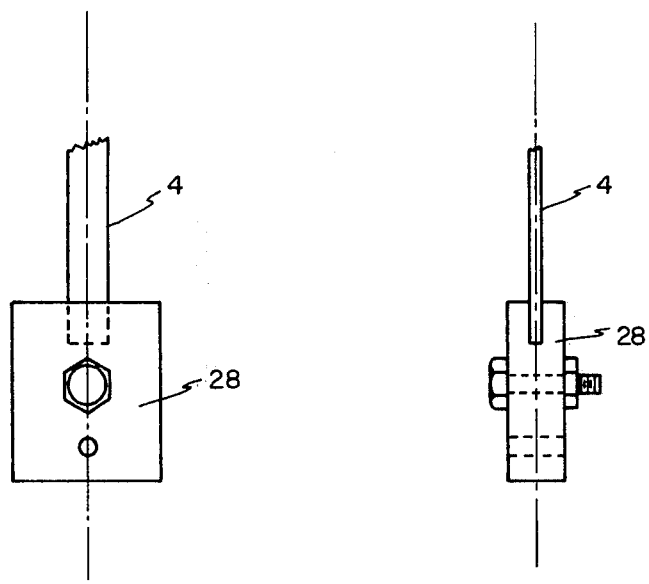
FIG. 7A
FIG. 7B

DEVICE TO MONITOR MOVEMENT OF A SURFACE

The present invention relates to devices to sense if the creep rate of a surface such as, for example, the roof of a mine, tunnel or the like exceeds some predetermined maximum value.

There accompany herewith two writings: "Mine Roof Creep Indicator" (Haimberger) and "The Mine Cave-In Detector" (Hand et al). There also accompanies herewith a copy of the Bachelor's thesis of the present inventor, entitled, "Roof Monitoring Apparatus for Tunnels," which thesis is hereby incorporated herein by reference.

With the increased need for coal as an energy source and the increased demand for underground raw materials and precious elements, underground mining will flourish on a large scale. Mine safety is a major concern of people who work in mines. Explosions, fires, and roof collapses are the major causes of death and injury in mines. At the present there exists no economical and reliable method of predicting when a mine roof will cave in . (See E. J. Cording, "Instrumentation in Tunnels," *Tunnel Construction-State of the Art and Research Needs*, Special Report 171, National Academy of Sciences, Washington, D. C., 1977.) The method now used to predict when a roof will cave in consists of having a technician travel through the mine daily to measure the distance between steel pins located in the ceiling and floor. From the convergence measurements, the velocity of the roof can be determined. From previously taken data of collapsed roofs, the velocity of impending collapse can be determined. There is a major expense involved in this method. There is the salary of the technician(s), the cost of the pins, and the cost of installation. Also the accuracy is dependent upon human measurements and calculations. With these periodical readings, anything can happen between measurements without warning. Also, as collapse nears, it becomes dangerous to take hand measurements.

Accordingly, it is an object of the present invention to provide a device to monitor, automatically, the velocity of roof movement in mines, tunnels or the like.

Another object is to provide a device that is economical, accurate and reliable.

Still another object is to provide a device which is compatible with a mine environment and compatible with systems used in mines.

A further object is to provide a device which can be easily integrated into automated mining techniques.

These and still further objects are addressed hereinafter.

The invention is described hereinafter with reference to the accompanying drawing in which:

FIG. 1 is a side partial section view showing a device of the present invention installed in the roof of a mine or the like;

FIG. 6A is an exploded side view of a portion of the device of FIG. 1;

FIG. 6B is an isometric view of an L-shaped key used in the device of FIG. 1;

FIGS. 7A and 7B are respectively a partial front view and a partial side view showing a creep-resistant, force-generating elongate member as it is held in a clamp, used in the device of FIG. 1;

Figure 1:
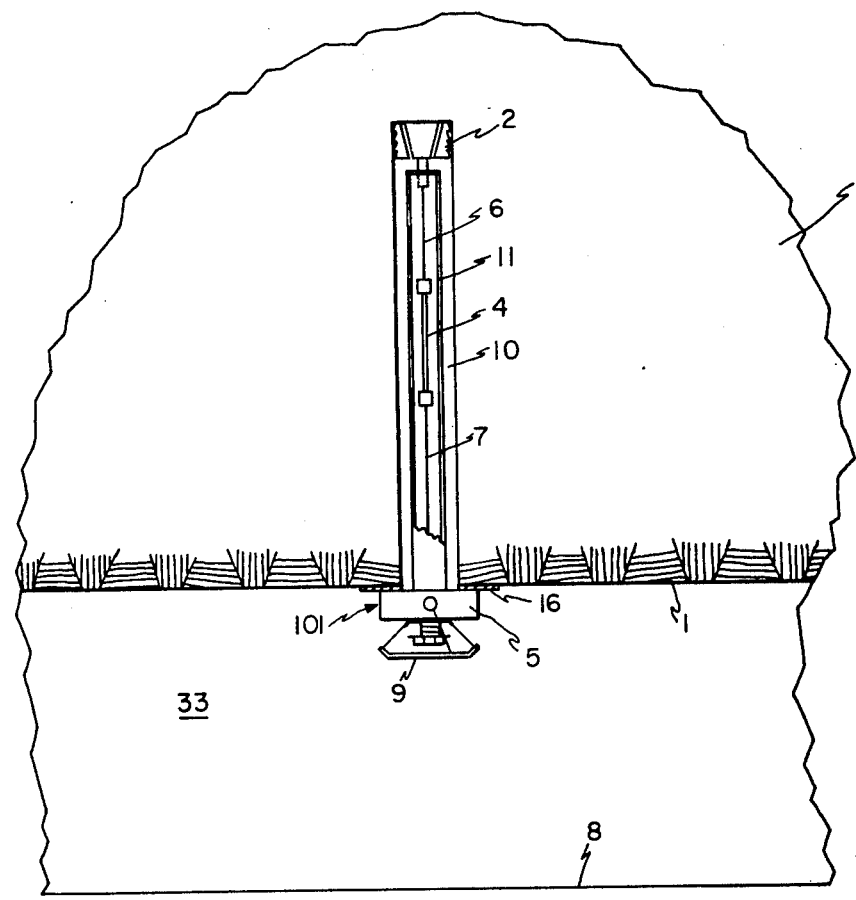

Before going into a detailed discussion of the invention, some preliminary remarks of a general nature now follow. The device labeled 101 in FIG. 1 serves to measure velocity of movement of the surface marked 1 which, for present purposes, can be the ceiling of the roof of a mine, for example. The device 101 constitutes economical, accurate, and reliable apparatus for monitoring the velocity of roof downward movement and the self-contained apparatus will issue a warning the very moment that the roof moves dangerously fast. The device 101 is disposed mostly within the bulk material shown at 3 of the mine roof above the surface 1 with less than six inches extending down into the working tunnel labeled 33 of the mine when in the monitoring position. The device 101 can be installed in a hole 10 drilled into the roof using roof-bolt installing machines now employed in mines.

The principle of operation of the device 101 is based on the fact that from the time an underground tunnel is formed until its collapse, the roof moves slowly downward. The movement begins at a very slow rate, after an initial displacement, and steadily increases in velocity. The initial steady-state creep rate may be as low as 0.001 inches per day for some materials. Studies have shown that typically a maximum safe rate of descent in some mine strata is approximately 0.01 inches per day, after which collapse occurred within approximately thirty days. It may be noted that the creep rate of the mine ceiling increases exponentially.

As explained hereinafter, the device 101 is installed in the mine roof in such a way that the creep of the roof downward causes elongation of a sensing member or specimen 4 in FIG. 1; the specimen is formed of a material whose precise creep characteristics as a function of stress and strain are known. A warning is triggered when the stress which corresponds to some known strain on the member 4 exceeds some predetermined amount.

Figure 3:
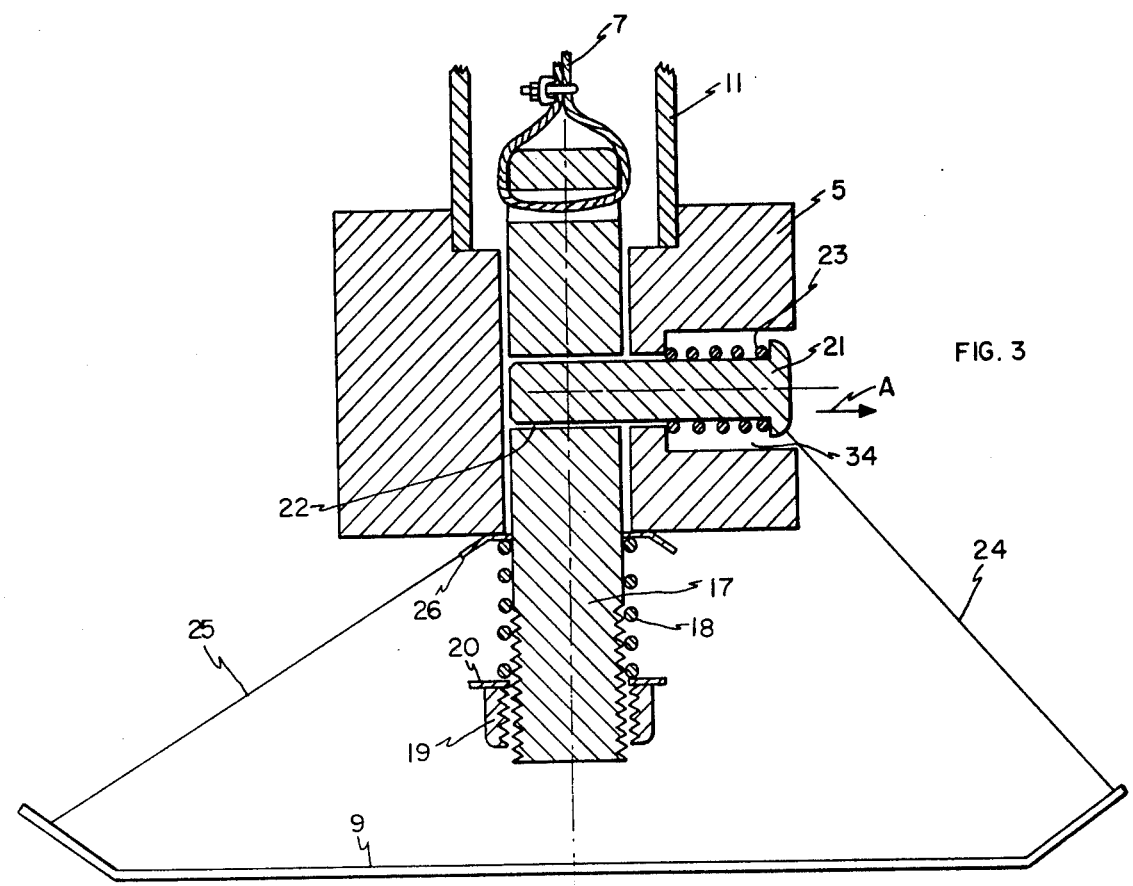
FIG. 3 is an enlarged side section view of the lower portion of the device of FIG. 1.
Figure 2:
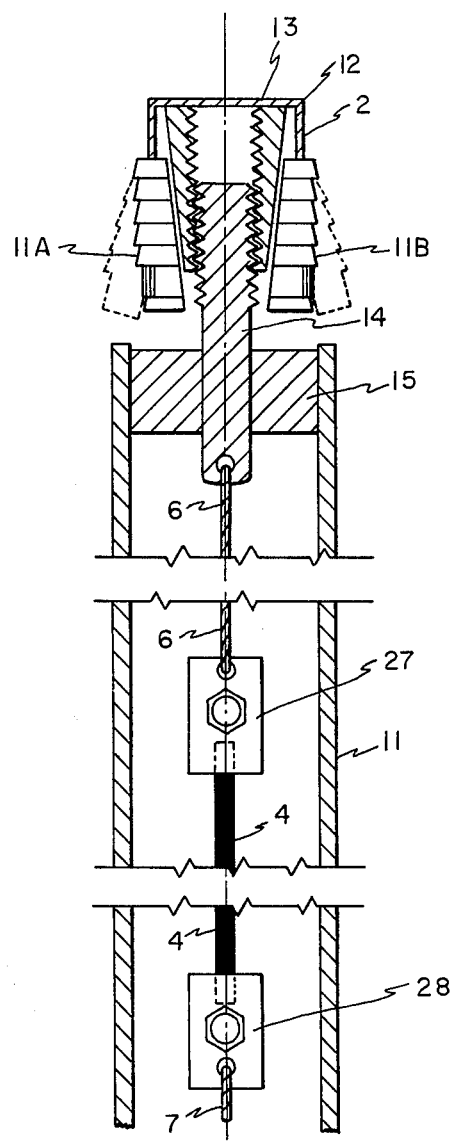
FIG. 2 is an enlarged side section view of the upper portion of the device of FIG. 1.

The device 101 includes an expansion anchor 2 that is inserted into the hole 10 in the bulk 3 of the material behind the surface to be monitored to reach a stable stratum therein. This stratum is stable relative to the surface to be monitored. Studies show that such stable stratum is typically about eight to ten feet into the mine roof. The device 101 further includes the creep-resistant, force-generating elongate member 4 and an anchor block 5 to rest against the surface 1 whose movement is to be monitored. The expansion anchor 2 is attached through a wire cable 6 and a clamp 27 to one end of the elongate member 4 and the anchor block 5 is attached to the other end of the elongate member 4 by a wire cable 7 and a clamp 28 so that, as later discussed, the elongate member is in tension between the two. The surface 1 may be the ceiling of a mine roof and, in accordance with the present teaching, if the roof 1 begins to move downward toward the mine floor labeled 8 at some predetermined high velocity or creep rate, a visual warning indicator 9 falls downward so as to present a visual indication of impending failure of the mine roof. The device 101 is now discussed in greater detail with reference to FIGS. 2 and 3 which together show the device 101. In FIGS. 2 and 3, the member 11 denotes a steel cylinder or tube that encloses the elongate creep member 4 and the associated parts, as shown. The hole 10 in FIG. 1 is drilled to be just slightly larger than the outer diameter of the cylinder 11. Once the device 101 is installed within the hole 10 expansion shells 11A and 11B are caused to move outward, as shown broken in FIG. 2, by rotating the entire device, to contact the inside of the hole 10 and keep the device 101 secure therein, the hole 10 being drilled to a stable stratum (about nine feet into the roof material 3). The extension of the shells 11A and 11B is accomplished in this way. The expansion anchor 2 further includes a wedge-shaped nut 12 and a bail 13. The bail 13, in practice, is lodged up against the end of the hole 10 to prevent rotation thereof and to keep the shells from sliding down off the nut 12. A bolt 14 threads up into the nut 12, drawing it downward to spread the tapered shells 11A and 11B (which are attached to the bail 13) outward into secure contact with the inside of the hole 10. Rotation of the bolt 14 is accomplished by rotating the anchor block 5, the force being through the cylinder 11 to a bushing 15 in which the bolt 14 is secured by pinning or welding. A plate 16 in FIG. 1 provides a positive and smooth bearing surface between the anchor block 5 and the ceiling 1, for easier rotation and to ensure that the block 5 moves downward with the surface 1.

Figure 4A:
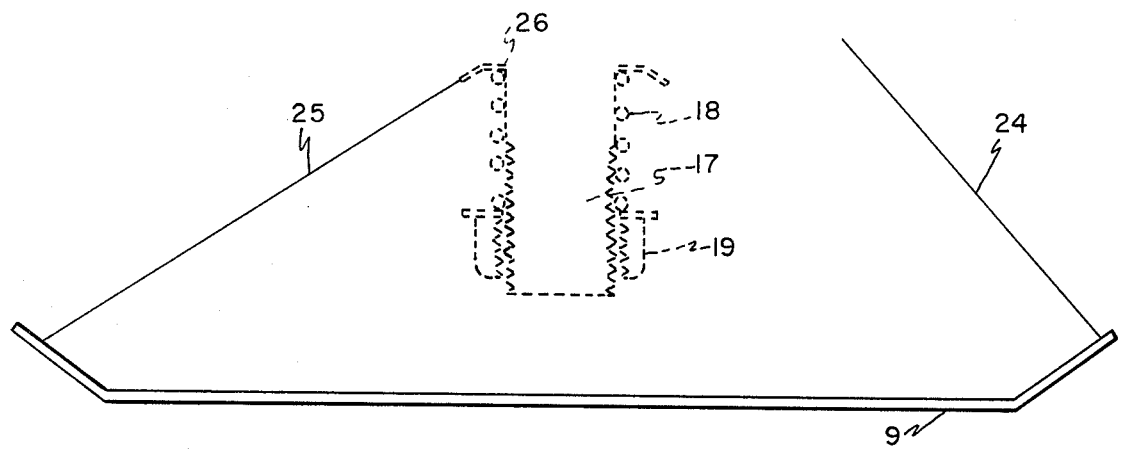
FIGS. 4A and 4B show the lowermost portion of the device of FIG. 1 respectively in a monitoring position and in a warning position.
Figure 4B:
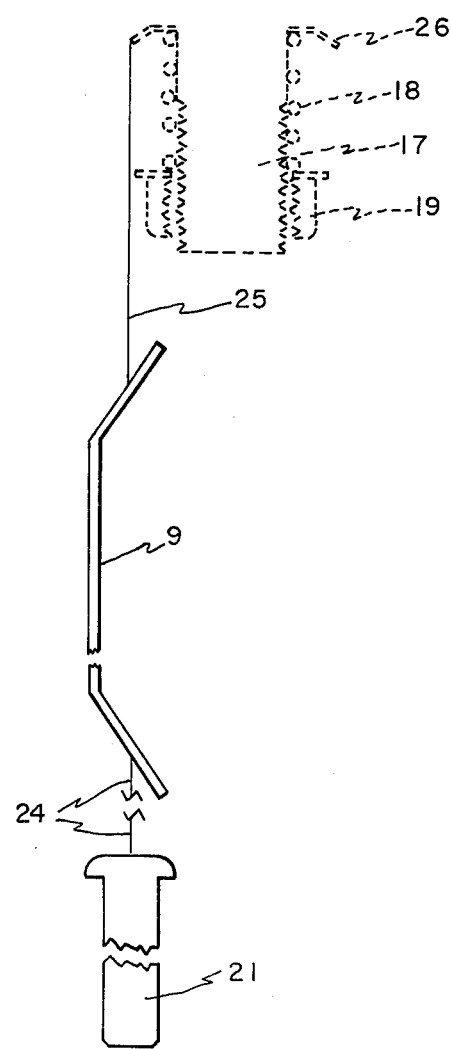

It is later shown that the cylinder 11 can slip upward away from the anchor block 5 so that at this juncture any tension forces between the expansion block 2 and the anchor block 5 are taken by the elongate member 4. This is to insure that the device can be installed with no slack in the elongate member 4 and its attaching cables 6 and 7. Also, in operation, the device can operate properly with all the strain being transmitted to the elongate member 4 with no effects from the tube 11. It should be noted that the only function of the tube 11 is to facilitate installation of the device and permit the anchor 2 to be tightened in the hole. If, therefore, the ceiling 1 creeps downward while the expansion anchor 2 is immovable, the member 4 will stretch. The lower end of the member 4 is, in fact, attached by the wire cable 7 to a spring-loaded main bolt 17, the loading being provided by a spring 18 in compression, the amount of compression (and, hence, tension loading on the member 4) being adjusted by threading a nut 19 onto the main bolt 17. The numeral 20 designates a washer. The bolt 17 has a transverse hole 22 therethrough to receive a spring-loaded trigger pin 21 that is ordinarily held by friction forces, caused by the spring 18, between the trigger bolt 21 and the inside of the hole 22, against pressure of a compressed spring 23 that tends to cause the trigger pin 21 to propel outward in the direction of the arrow labeled A. The visible indicator 9 is a pie-pan like structure which is attached to the trigger bolt 21 by a flexible wire 24 and to a washer 26 by a flexible wire 25. Once the trigger pin 21 leaves the recess marked 34 in the anchor block 5, the monitoring position of the indicator 9, as shown in FIG. 4A, is changed to the warning position shown in FIG. 4B. The change from the monitoring position in FIG. 4A to the warning position of FIG. 4B occurs only upon the occasion of excessive tensile stress as a result of excessive strain upon the member 4 and release of friction forces upon the trigger pin 21 in FIG. 3, as now explained.

The elongate member 4 is attached to the wire cable 6 by the clamp 27 and to the wire cable 7 by the clamp 28 in FIG. 2. Once the device 101 is installed in the hole 10 and the expansion anchor 2 is set to prevent downward movement thereof, the device 101 is set. Setting is accomplished by threading the torque nut 19 in FIG. 3 upward upon the main bolt 17, which may be effected using a torque wrench. Considerations and formulas for determining required torque are given in the Graham thesis. At this juncture, the member 4 is suspended in tension within the tube 11 between the expansion anchor 2 and the anchor block 5. Any downward movement of the anchor block 5 will produce a strain (and strain rate) and corresponding stress on the elongate member 4 which, as shown in FIGS. 7A and 7B is rectangular in cross-section and its length is much greater than its width. The material characteristics of the member 4 are chosen to have creep characteristics which enable the member 4 to creep and reduce the corresponding stress as it occurs to effect little or no change on the frictional interaction between the main bolt 17 and the trigger pin 21 during acceptable creep rates of the surface 1 but to enable it to provide a sufficient reduction of the corresponding stress, which can build up, which causes a drastic decrease in such friction if that creep rate of the surface 1 exceeds some predetermined maximum amount. If the latter condition exists, the member 4 will force the main bolt 17 upward so that the trigger pin 21 will float in the hole 22 causing such frictional force to be reduced to an amount that the spring 23 will propel the trigger pin 21 outward in the manner above discussed. Hence, the characteristics of the member 4 must be such that when the tensile strain rate thereon exceeds some predetermined limit, its correspondingly induced stress increases to the point where the upward force on the main bolt 17 is equal to or greater than the downward force caused by the spring 18. (Later it is shown that the length of the member 4 is a consideration; see also the Graham thesis.) The most suitable material found to date to provide the necessary characteristics is a wrought zinc alloy made by New Jersey Zinc Company and designated mix No. 15 zinc.

The No. 15 alloy consists of the following percentages of elements: lead 0.26, iron 0.010, cadmium 0.008, copper 0.77, magnesium 0.007 and the balance zinc. The mechanical properties of the alloy are:

| Tensile strength, 1000 psi (long.) | 24.2 – 31.5 |
|---|---|
| (trans.) | 31.3 – 38.5 |
| Elongation (in 2 in.), % (long.) | 26 – 39 |
| (trans.) | 12 – 29 |
| Creep rate, hot rolled days/% at 10,000 psi, 77° F (long.) | 15 |

The characteristics of the zinc-alloy member 4 that make it ideal are discussed in this paragraph and the next. As the roof creeps downward, the lower block 5 must move at the same strain rate. This produces a strain (and strain rate) on the zinc-alloy member 4 and a corresponding stress on it. As a result of this stress the member 4 begins to creep. If the strain rate is constant, the corresponding stress on the zinc decreases slightly with time due to an infinitesimal reduction in the crosssectional area of the zinc (see FIG. 9B hereof). However, if the strain rate increases gradually or violently with time, the corresponding stress in the zinc will either be constant or will increase with time (see FIG. 9C). When the stress on the zinc-alloy member 4 is sufficient to produce a force upward on the main pin 17 which differs from the downward force thereon exerted by the mainspring 18 by an amount sufficient to produce a frictional force between the trigger pin 21 and the main bolt 17 and the block 5 which about equals or is slightly less than the outward force exerted on the trigger pin 21 by the spring 23, the trigger pin 21 will propel outward, as above indicated.

Figure 9A:
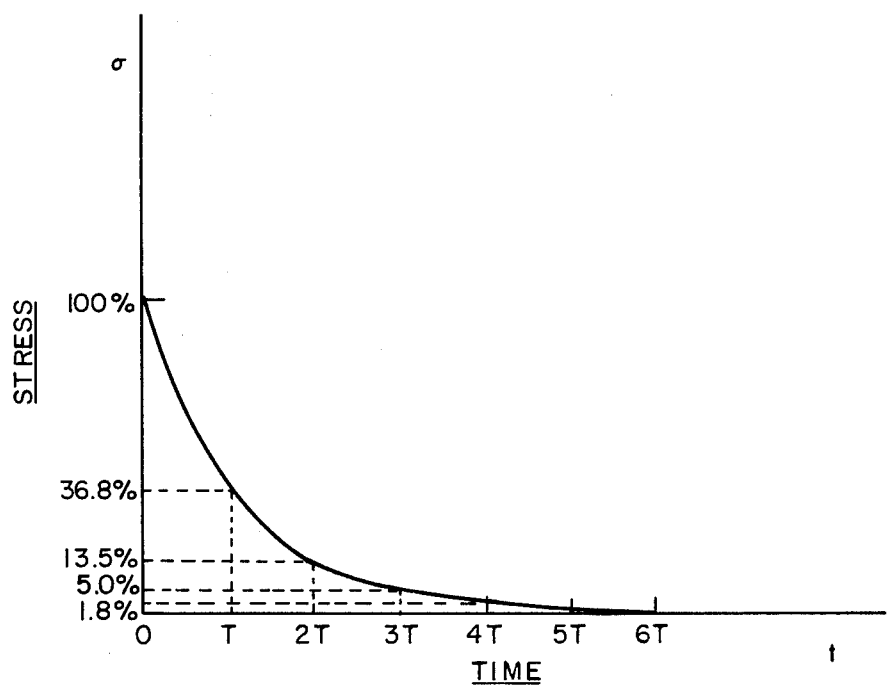
FIGS. 9A, 9B and 9C show stress decay rates, as a result of creep, for the member of FIGS. 7A and 7B when the material thereof is a zinc alloy.
Figure 9B:
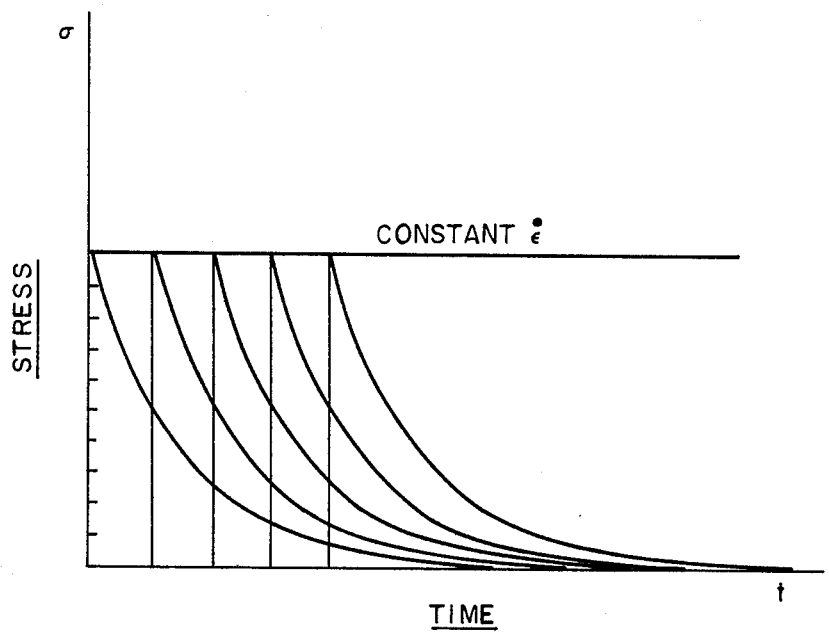
Figure 9C:
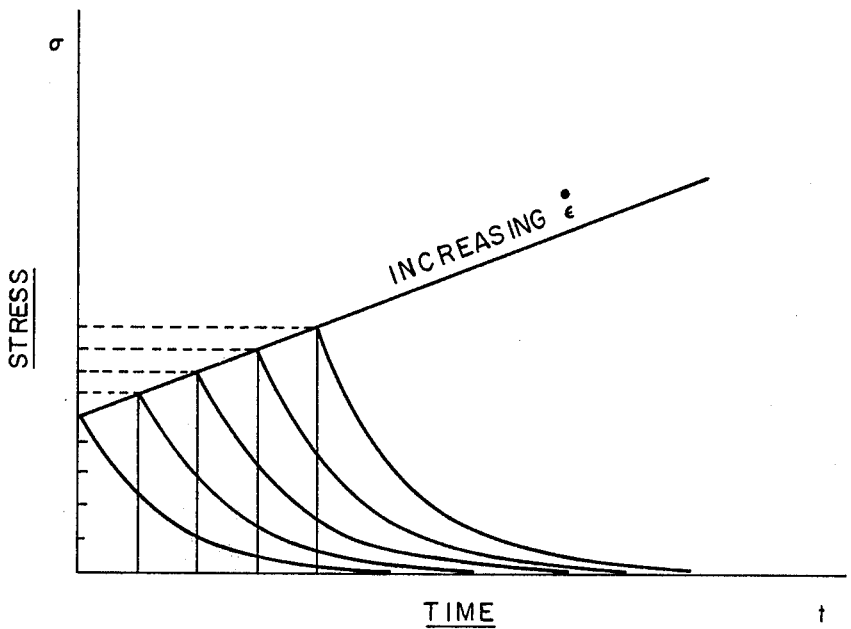

When zinc receives a small strain (a step input), it responds by an elastic extension. The elastic extension, in turn, causes a stress increase. If the stress increase is large enough to initiate creep, the specimen creeps and the stress reduces. The continuing creep characteristic of the zinc is to have an initial stress increase and then creep which causes an exponential decay of the stress, as shown in FIG. 9A. The recovery time depends upon how great the initial stress is, but since it is an exponential curve, the larger the initial stress the larger the initial creep rate. Therefore, the decay time to reduce the stress 99% of its peak increase is approximately the same for all amounts of initial stress increase. If the stress on the member 4 is in a continuous fashion, then the results shown in FIGS. 9B and 9C result.

Figure 5A:
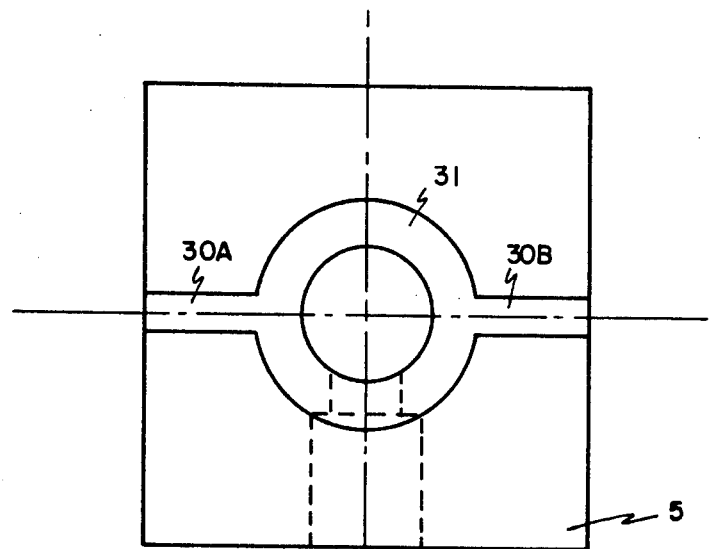
FIGS. 5A and 5B are respectively a top view and a side view of an anchor block which is a part of the device of FIG. 1.
Figure 5B:
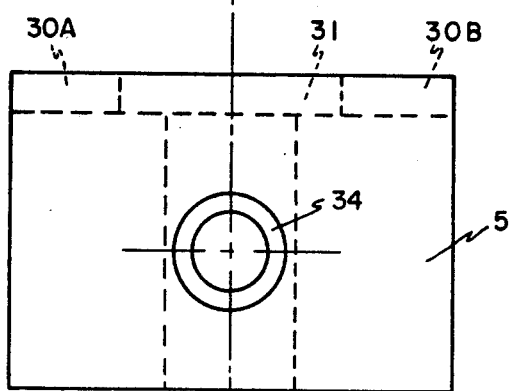

It is noted above that the device 101 is secured within the hole 10 by turning the block 5 and, hence, the tube 11. Torque between the two is accomplished through L-shaped keys 29A and 29B in FIGS. 6A and 6B, the keys being received within slots 30A and 30B, respectively, in the anchor block 5 in FIGS. 5A and 5B. The vertical portion of the keys 29A and 29B are received within slots at the lower end of the tube 11 in FIG. 6A. The keys are L-shaped to maintain torque transmission even if the tube 11 should be screwed upward to an amount such that it is no longer in contact with the block 5. In assembly, the keys 29A and 29B in FIG. 6A move downward into the slots 30A and 30B and the tube 11 moves downward to be received by a machined recess 31; the fit of the tube 11 in the recess 31 is a slip fit, that is, not tight enough to support any appreciable tension between the expansion block 2 and the anchor block 5.

Figure 8:
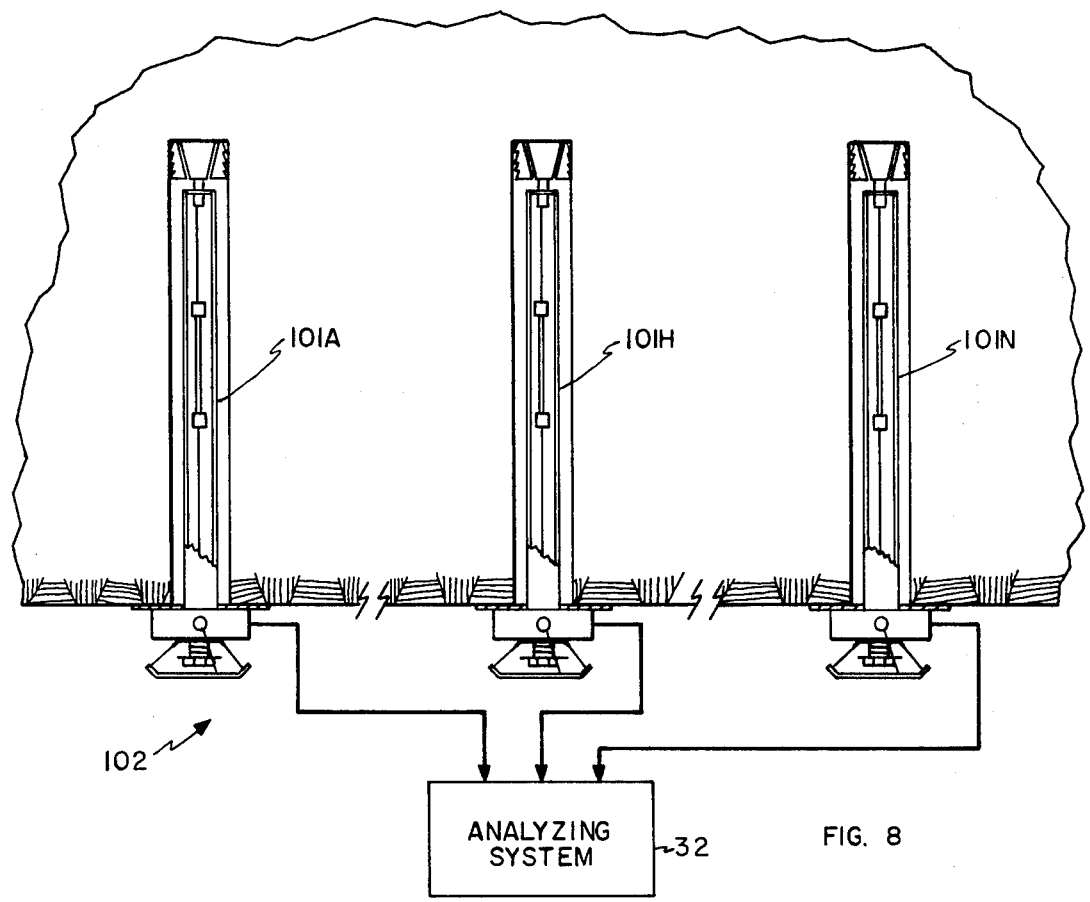
FIG. 8 shows a plurality of devices, similar to the device of FIG. 1, in the form of an array.

The system shown at 102 in FIG. 8 includes a plurality of devices 101A ... 101H ... 101N in the form of an array. The devices 101A ... are like the device 101 except that the signal of warning generated when the roof creep rate exceeds some predetermined amount is an electrical signal generated by any or all the devices 101A ... The signal-generating means may be a piezoelectric device or other transducer activated by a trigger bolt like the bolt 21. An analyzing system 32 is connected to receive signals from the devices 101A ... and to provide an output (e.g., alarm horn, light or remote signal) based thereon.

The device 101 represents a self-contained unit to provide economical, accurate and reliable monitoring of movement of the ceiling or other wall (e.g., side wall or floor) of a mine, tunnel or the like. It is adequate to withstand the rigors of its environment and it can be installed using presently available equipment. It has a measuring resolution greater than needed to be sufficient to record any detectable movement of the roof. It can be installed to provide continuous monitoring until collapse, and it is reusable, even if tripped, until the zinc has finally been elongated to its maximum percentage of elongation.

Further modifications of the invention herein disclosed will occur to persons skilled in the art and all such modifications are deemed to be within the spirit and scope of the invention as defined by the appended claims.

What is claimed is:

1. A device to monitor movement of a surface that comprises, in combination: an expansion anchor that is inserted into the bulk of the material behind the surface to be monitored to reach a stable stratum therein; a creep-resistant, force-generating, elongate member; an anchor block to rest against the surface whose movement is to be monitored; the expansion anchor being secured to one end of the elongate member and the anchor block being attached to the other end of the elongate member so that said elongate member is in tension between the two; and means to denote if the tension of the elongate member exceeds some predetermined amount, the creep-resistant, force-generating elongate member being operable to measure velocity or creep rate of movement of said surface and the tension on the elongate member being a function of said velocity.

2. A device as claimed in claim 1 wherein the creep-resistant, force-generating member is an elongate, zinc-alloy member.

3. A device as claimed in claim 1 wherein the means to denote provides a mechanical indication when said predetermined amount is exceeded.

4. A device as claimed in claim 3 having a spring-loaded connecting bolt that is connected to said other end of the elongate member and in which the means to denote comprises a triggering mechanism and a warning device that is activated when the creep rate exceeds said predetermined amount.

5. A device as claimed in claim 4 in which the connecting bolt has a transverse hole, in which the triggering mechanism comprises a spring-loaded pin that is inserted into said hole and held therein by friction except when said tension force on the elongate member is about equal to a preset spring force on the bolt, at which time the spring force on the pin overcomes frictional forces thereon and causes the pin to propel from said hole and trigger the warning device.

6. A device as claimed in claim 5 wherein the warning device is a visible indicator.

7. A device as claimed in claim 5 wherein the warning device is an audible alarm.

8. A device as claimed in claim 5 that includes means to emit an electrically controlled signal and wherein the warning device serves to activate the means to emit an electrically controlled signal.

9. A device as claimed in claim 1 wherein the surface is the roof of an underground chamber and in which the device is a velocity-referenced, roof creep sensor which gives a warning if the roof begins to move at a velocity beyond some predetermined value.

10. A device as claimed in claim 1 wherein the creep-resistant, force-generating elongate member is a zinc alloy that includes small amounts of lead, iron, copper and magnesium to match characteristic movement of said surface.

11. Apparatus that includes a plurality of devices as claimed in claim 1 in the form of an array and in which each said means to denote includes means to generate a signal when said predetermined amount is exceeded and that further includes means to monitor the signals from the devices of the array and provide an output on the basis of the combined signals received therefrom.

* * * * *